United States Patent
Masella

(10) Patent No.: US 11,634,081 B2
(45) Date of Patent: Apr. 25, 2023

(54) VEHICLE SLIDABLE PLATFORM ASSEMBLY

(71) Applicant: Stephen J. Masella, Wallingford, CT (US)

(72) Inventor: Stephen J. Masella, Wallingford, CT (US)

(*) Notice: Subject to any disclaimer, the term of this patent is extended or adjusted under 35 U.S.C. 154(b) by 106 days.

(21) Appl. No.: 16/838,178

(22) Filed: Apr. 2, 2020

(65) Prior Publication Data

US 2020/0317132 A1 Oct. 8, 2020

Related U.S. Application Data

(60) Provisional application No. 62/829,715, filed on Apr. 5, 2019.

(51) Int. Cl.
| | | |
|---|---|---|
| *B60R 3/00* | (2006.01) | |
| *B62D 65/16* | (2006.01) | |
| *B60S 5/00* | (2006.01) | |
| *B60R 11/06* | (2006.01) | |

(52) U.S. Cl.
CPC .............. *B60R 3/007* (2013.01); *B62D 65/16* (2013.01); *B60R 11/06* (2013.01); *B60S 5/00* (2013.01)

(58) Field of Classification Search
CPC ......... B60R 3/007; B60R 11/06; B62D 65/16; B62D 65/026; B60S 5/00
See application file for complete search history.

(56) References Cited

U.S. PATENT DOCUMENTS

| | | | | |
|---|---|---|---|---|
| 4,917,430 | A * | 4/1990 | Lawrence | B60R 9/02 224/281 |
| 5,135,274 | A * | 8/1992 | Dodd | B60R 19/48 414/466 |
| 9,981,608 | B1 * | 5/2018 | DoVale | B60R 3/007 |
| 2005/0092797 | A1 * | 5/2005 | Takahashi | B62J 7/00 224/538 |
| 2007/0007073 | A1 * | 1/2007 | Keller | B60R 3/007 182/115 |
| 2018/0072254 | A1 * | 3/2018 | Wymore | B60R 11/06 |
| 2019/0176707 | A1 * | 6/2019 | Liao | B60R 3/007 |
| 2021/0146842 | A1 * | 5/2021 | Niemela | B60R 11/06 |

\* cited by examiner

*Primary Examiner* — Sarang Afzali
*Assistant Examiner* — Darrell C Ford

(57) ABSTRACT

The present invention relates to a slidable platform assembly and a method of attaching the assembly to the front end of a vehicle. The assembly comprises a frame attachable to a receiver secured to the front end of the vehicle and also comprises a platform slidable within the frame. Various embodiments of slidable platform assembly and methods of attachment to the receiver of the vehicle are herein disclosed.

20 Claims, 16 Drawing Sheets

VEHICLE SLIDABLE PLATFORM ASSEMBLY

CROSS-REFERENCE TO RELATED APPLICATIONS

This application claims the benefit under 35 USC 119 of U.S. Provisional Patent Application No. 62/829,715, filed Apr. 5, 2019, the disclosure of which is hereby incorporated herein by reference in its entirety for all purposes.

BACKGROUND OF THE INVENTION

1. Field of the Invention

The present invention relates a platform that can be removably attached to the front of a vehicle, such as a pick-up truck.

2. Description of the Related Art

There are several types of steps or platform that have been designed to be attachable to portions of a vehicle. For example, runners have long been available along the side of a vehicle for a passenger to easily step up into or down out from the vehicle interior. In addition, horizontal platforms have also been made as retractable accessories or temporary attachments to the rear of a vehicle, such as a pick-up truck or SUV, in order to assist in the loading and unloading of cargo. Rear platform attachments are typically mounted using a single connection bar often having a square cross-sectional shape. The bar can be inserted into a mounting sleeve attached to the vehicle frame, such as the sleeve for a towing hitch. Once the hitch is removed, the platform bar may then slid into the sleeve and attached. Other accessories may also be secured to the tow hitch sleeve, in a similar way, such as a winch or a loading rack for bicycles.

A variety of different types of devices are also available for attachment to the front end of a vehicle. For example, heavy equipment such as snow plows can be attached to the front end of a truck, typically using two plow mounting receivers, also called push plates, attached to the truck frame and positioned beneath the front bumper. In addition, tire racks or brush guards can also be attached to the front of a vehicle using these same two mounting locations, sometimes stabilized by tie lines to tow hooks also mounted onto the frame.

A particular problem for many vehicles, especially pick-up trucks, is gaining access to all parts of the engine in order to do maintenance or repairs. Trucks and SUVs are typically too high off the ground for the average person, forcing them to use a ladder or step stool in order to reach under the hood and into the engine compartment. However, the stool or ladder must be continuously repositioned if different parts of the engine require work, making even simple repair work such as oil changes or replacing spark plug and wires extremely cumbersome and time consuming. This is a particular issue for heavy duty trucks, which are much higher off the ground and requiring taller steps or ladders to reach over the truck grill and into the engine cavity. What is needed is a device that can be readily attached to the front of the truck that is wide enough and high enough to provide easy access to the engine and sufficiently sturdy to enable a person to comfortably perform desired repair or maintenance.

SUMMARY OF THE INVENTION

The present invention solves the problem of accessing the engine compartment of a vehicle such as a heavy duty truck and relates to a horizontally slidable platform assembly that can be attached to one or more, preferably two, mounting receivers, such as push plates, attached to the vehicle's frame.

The present disclosure relates to a platform assembly comprising as stationary frame attachable to one or more receivers secured to the front end of a vehicle and a slidable platform positioned within the stationary frame. In one embodiment, the stationary frame comprises at least one insert section configured to be inserted into the receivers, at least one attachment section configured to secure the stationary from to the receivers, or both. Attachment pins may be inserted into holes in the attachment sections for securing to the receiver. Positioning pins may also be inserted into pin holes in the platform to prevent the platform from sliding. The platform and the stationary frame comprise one or more stops for extending or retracting the platform.

The present disclosure relates to a method of attaching a platform assembly to a vehicle, the platform assembly comprising a stationary frame and a slidable platform positioned with the stationary frame. In one embodiment, the stationary frame of the platform assembly is secured to one or more receivers of the vehicle with the platform secured within the stationary frame. In another embodiment, the stationary frame is secured to the vehicle without the platform and the method further comprises sliding the platform into the secured stationary frame.

It is to be understood that both the foregoing general description and the following detailed description are exemplary and explanatory only and are intended to provide further explanation of the present invention, as claimed.

It should be understood that the above-referenced drawings are not necessarily to scale and may, in some cases, present a somewhat simplified representation of various preferred features illustrative of the basic principle of the disclosure. The specific design features of the present disclosure, including, for example, specific dimensions, orientations, locations, and shapes, will be determined in part by the particular intended application and use environment.

DETAILED DESCRIPTION OF THE INVENTION

The present invention relates to a platform assembly removably attachable to the front end of a vehicle.

The platform assembly comprises a stationary frame and a platform slidably positioned within the frame. The frame includes attachment sections configured to be secured to corresponding receivers on the vehicle, such as a push plate system. In some embodiments, the frame further comprises at least one frame slide stop to control or otherwise restrict the extent of retraction and extension of the platform within the frame, and the platform comprises at least one corresponding slide stop sections that meets the frame slide stops.

Specific embodiments and components of the slidable platform assembly of the present invention are shown in the figures and described in more detail below. However, it should be apparent to those skilled in the art that these figures are meant to clarify the present invention and are not intended to be limiting of the scope of the invention, being provided as only exemplary in nature. Numerous modifications and other embodiments are contemplated as falling within the scope of the present invention, given the present disclosure. In addition, those skilled in the art would appreciate that the specific configurations are exemplary and that actual configurations will depend on the specific details of the application of the platform assembly. Those skilled in the art will also be able to recognize and identify equivalents to the specific elements shown, using no more than routine experimentation.

Figure 1A:
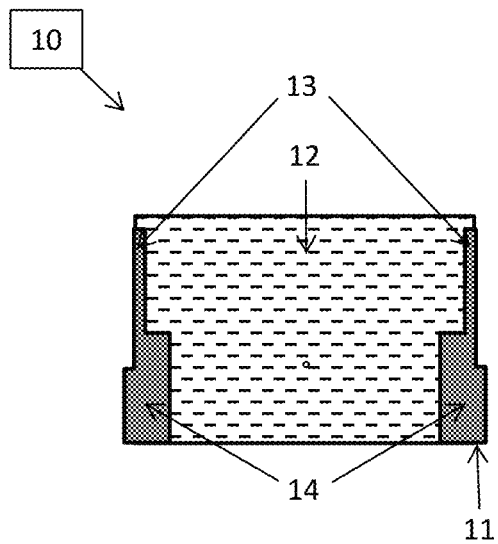
FIGS. 1A-1D are top views of an embodiment of the slidable platform assembly of the present invention.
Figure 1B:
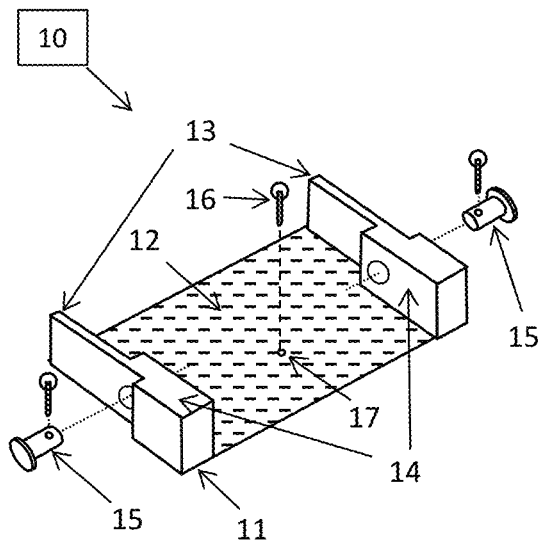
Figure 1C:
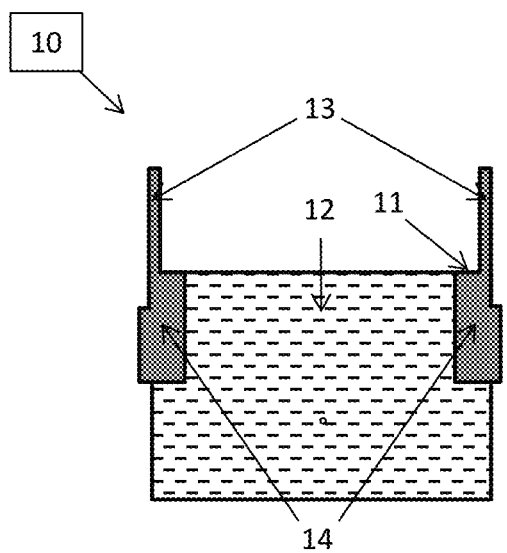
Figure 1D:
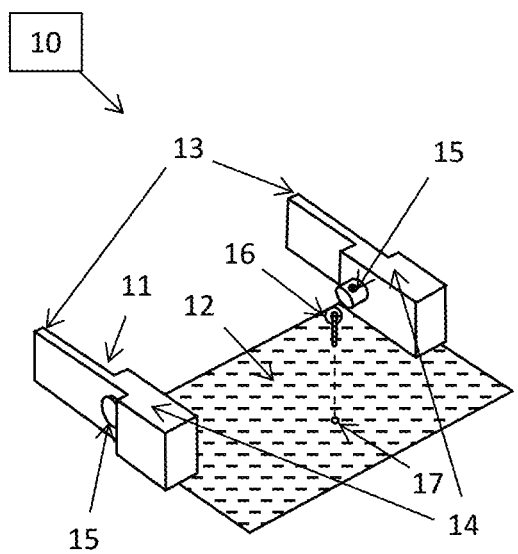

FIGS. 1A-1D show an embodiment of the slidable platform assembly of the present invention from an overhead perspective. In particular, FIG. 1A and FIG. 1C are top views of assembly 10, and FIG. 1B and FIG. 1D are top perspective views. As shown in these figures, platform assembly 10 comprises frame 11 and platform 12 positioned and slidable within the frame. Frame 11 comprises insert sections 13 and attachment sections 14, which may be used to secure the assembly to a vehicle, such as with attachment pins 15, which can be inserted through the attachment section from the platform side or from outside the frame (as shown in FIG. 1B and FIG. 1D). Attachment methods are described in more detail below. Platform 12 slides within frame 11 between a retracted position, as shown in FIGS. 1A and 1B, and an extended position, as shown in FIGS. 1C and 1D. The platform may be secured in either position using positioning pin 16, which is insertable into pin hole 17 in the platform. The inserted positioning pin restricts the movement of the platform after extension or retraction. As shown, the surface of the platform may be textured, such as with a diamond hash pattern, to provide slip resistance.

Figure 2A:
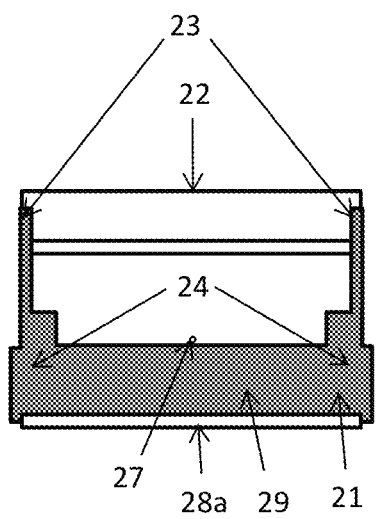
FIGS. 2A-2D bottom views of an embodiment of the slidable platform assembly of the present invention.
Figure 2B:
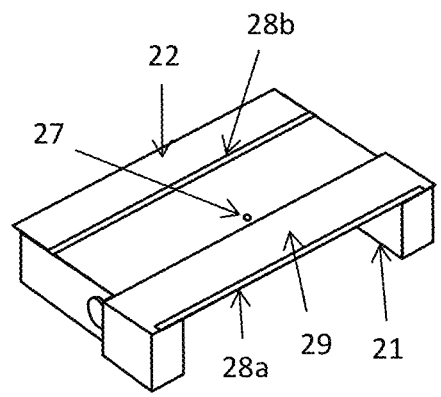
Figure 2C:
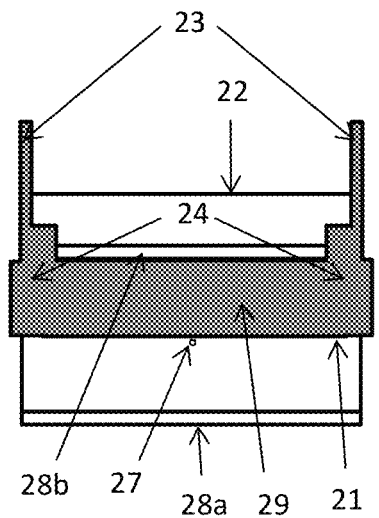
Figure 2D:
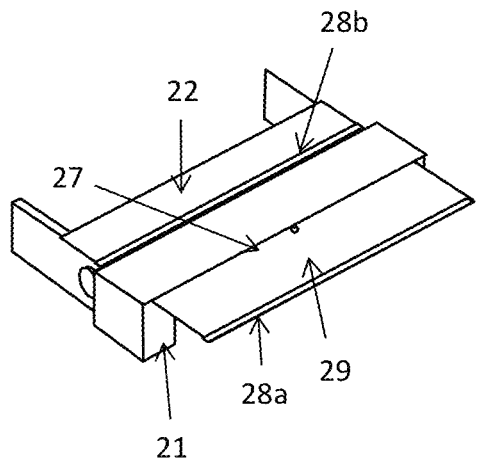

FIGS. 2A-2D show an embodiment of the slidable platform assembly of the present invention from an underneath perspective. In particular, FIG. 2A and FIG. 2C are bottom views of assembly 20, and FIG. 2B and FIG. 2D are bottom perspective views, which more clearly show aspects of the frame. For example, as shown in these figures, platform assembly 20 comprises frame 21 along with platform 22 positioned and slidable within the frame. Frame 21 comprises insert sections 23 and attachment sections 24, to secure the assembly to a vehicle as in FIGS. 1A-1D and described in more detail below.

Platform 22 may slide within frame 21 between the retracted position shown in FIGS. 2A and 2B and the extended position shown in FIGS. 2C and 2D. The platform further includes platform stops 28a and 28b, and the frame further includes frame stop 29. As shown, when the platform is in the retracted position, platform stop 28a contacts one side of frame stop 29, preventing the frame from retracting further. Also, a positioning pin may be inserted into pin hole 27, preventing the platform from sliding outward to an extended position. This is particularly useful for keeping the platform securely retracted when the vehicle is in motion. When desired, the attachment pin may be removed, and the platform may be moved from the retracted position to an extended position. Platform stop 28b then contacts the other side of frame stop 29, preventing the platform from further extending from the platform. A positioning pin may be inserted into pin hole 27, preventing the platform from retracting. In this way, the platform can be secured when a person stands on it in use. Additional stops or stops of different configuration may also be used to function in a similar way, as would be understood by one of ordinary skill in the art. For example, frame stop 29 may be two separated stops, positioned in similar positions as shown in FIGS. 2A-2D, and one platform stop position between them.

Figure 3A:
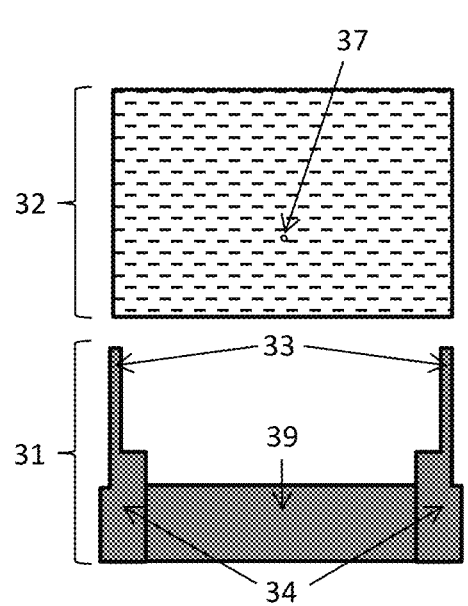
FIGS. 3A-3D are exploded views of an embodiment of the slidable platform assembly of the present invention.
Figure 3B:
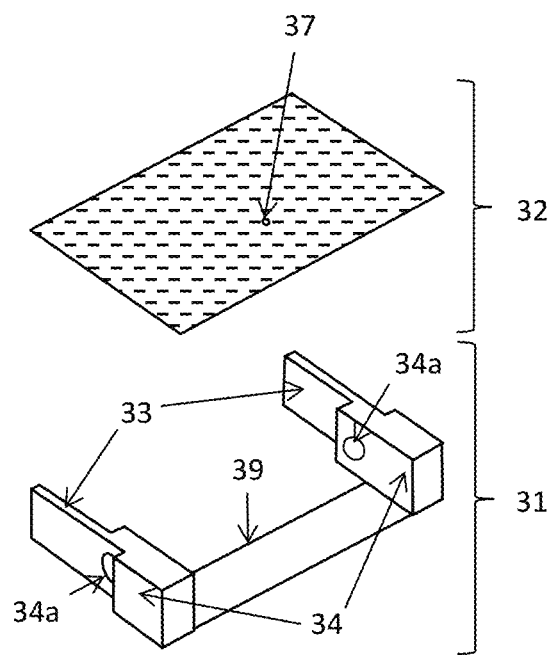
Figure 3C:
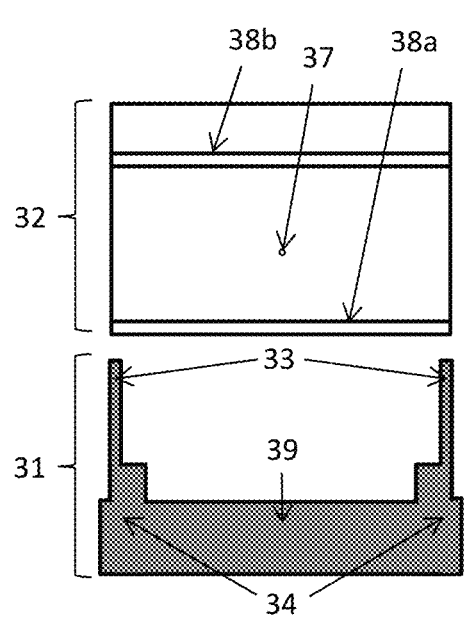
Figure 3D:
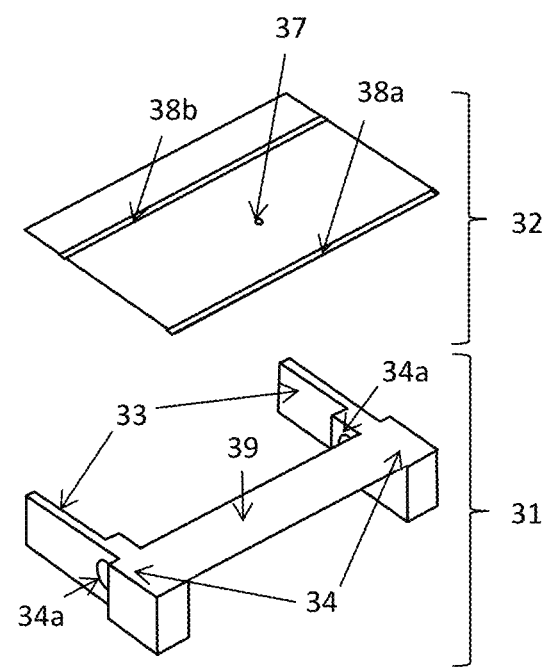

FIGS. 3A-3D show an exploded view of an embodiment of the slidable platform assembly of the present invention. In particular, FIG. 3A and FIG. 3C are top and bottom views respectively of the assembly while FIG. 3B and FIG. 3D are perspective views, and each show platform 32 separated from frame 31. As shown, the frame comprises insert sections 33, attachment sections 34, and frame stop 39. In addition, the platform comprises platform stops 38a and 38b. The assembly may further comprise attachment pins, insertable into attachment holes 34a in the attachment sections of the frame, and a positioning pin insertable into pin hole 37 in the platform, as discussed in more detail above.

Figure 4:
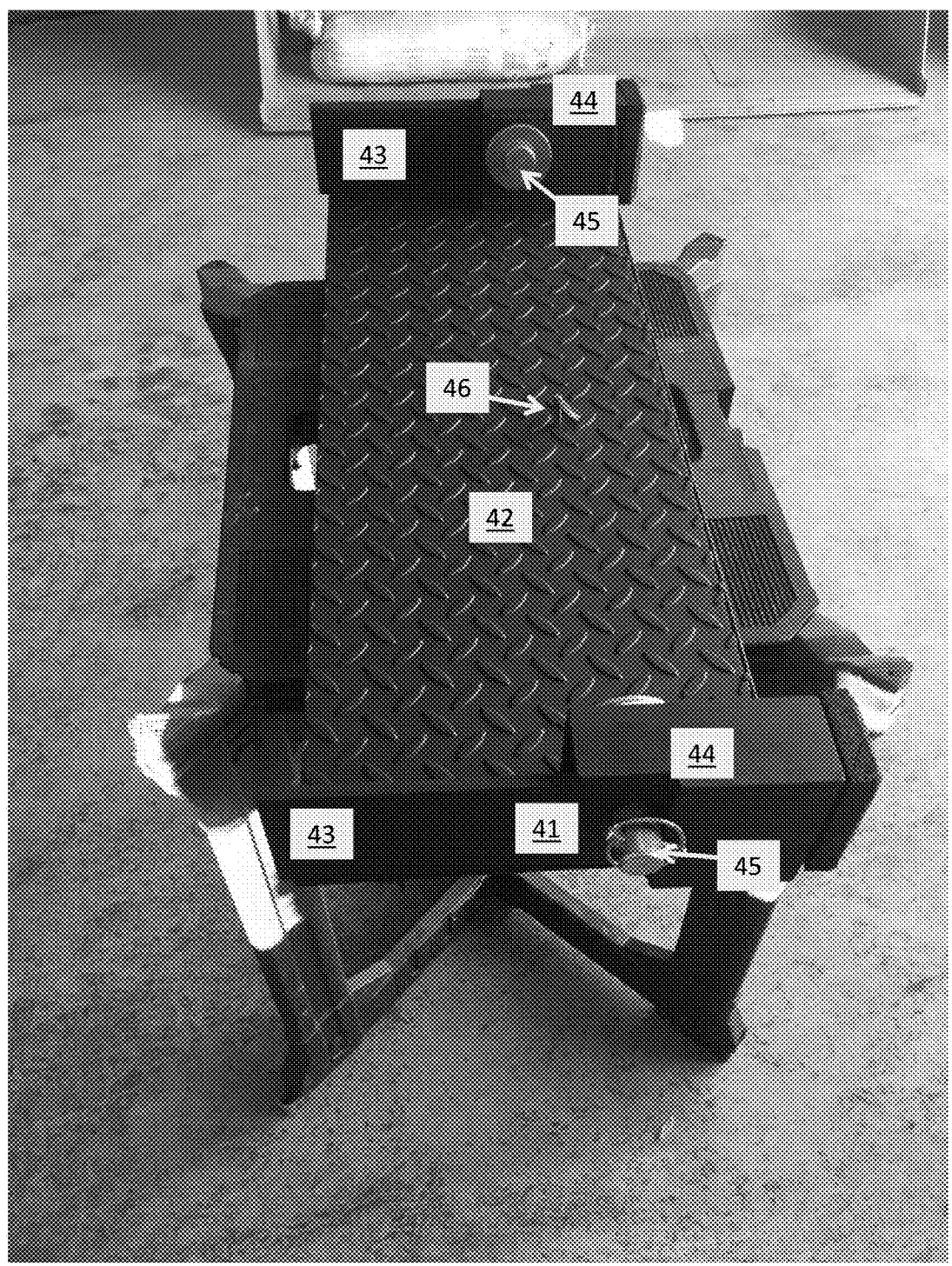
FIGS. 4-6 are side, back, and bottom views of a prototype of an embodiment of the slidable platform assembly of the present invention.
Figure 5:
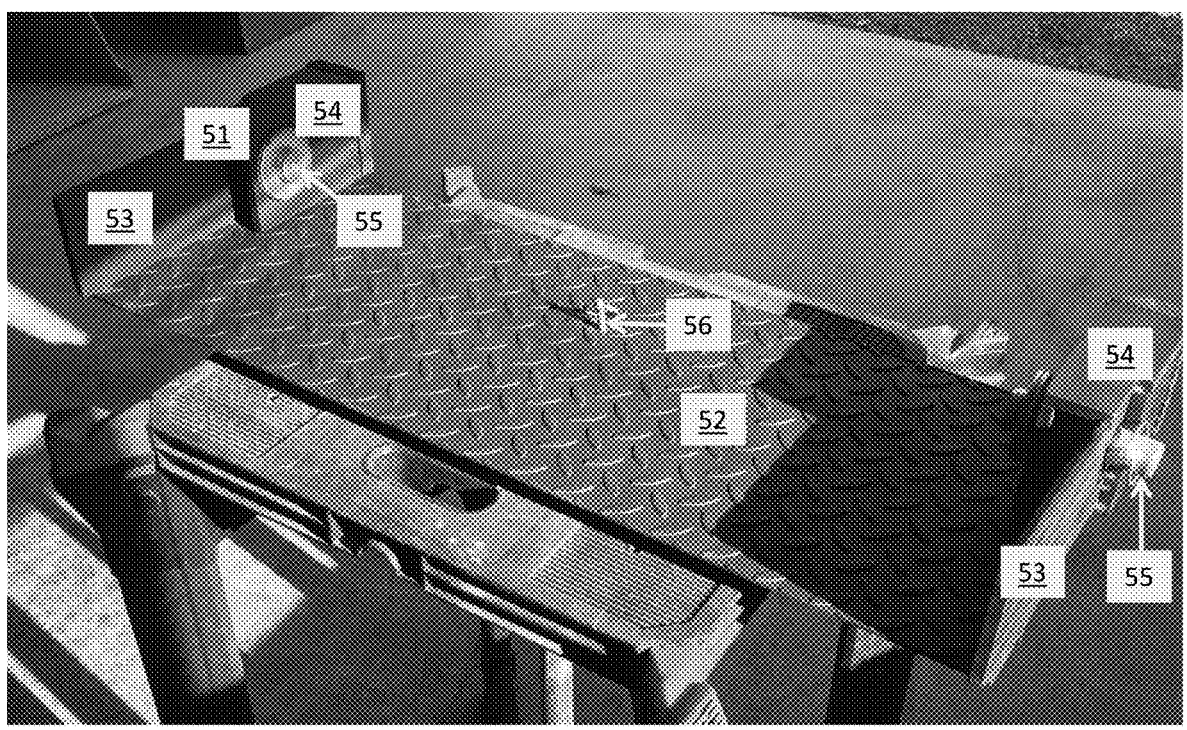
Figure 6:
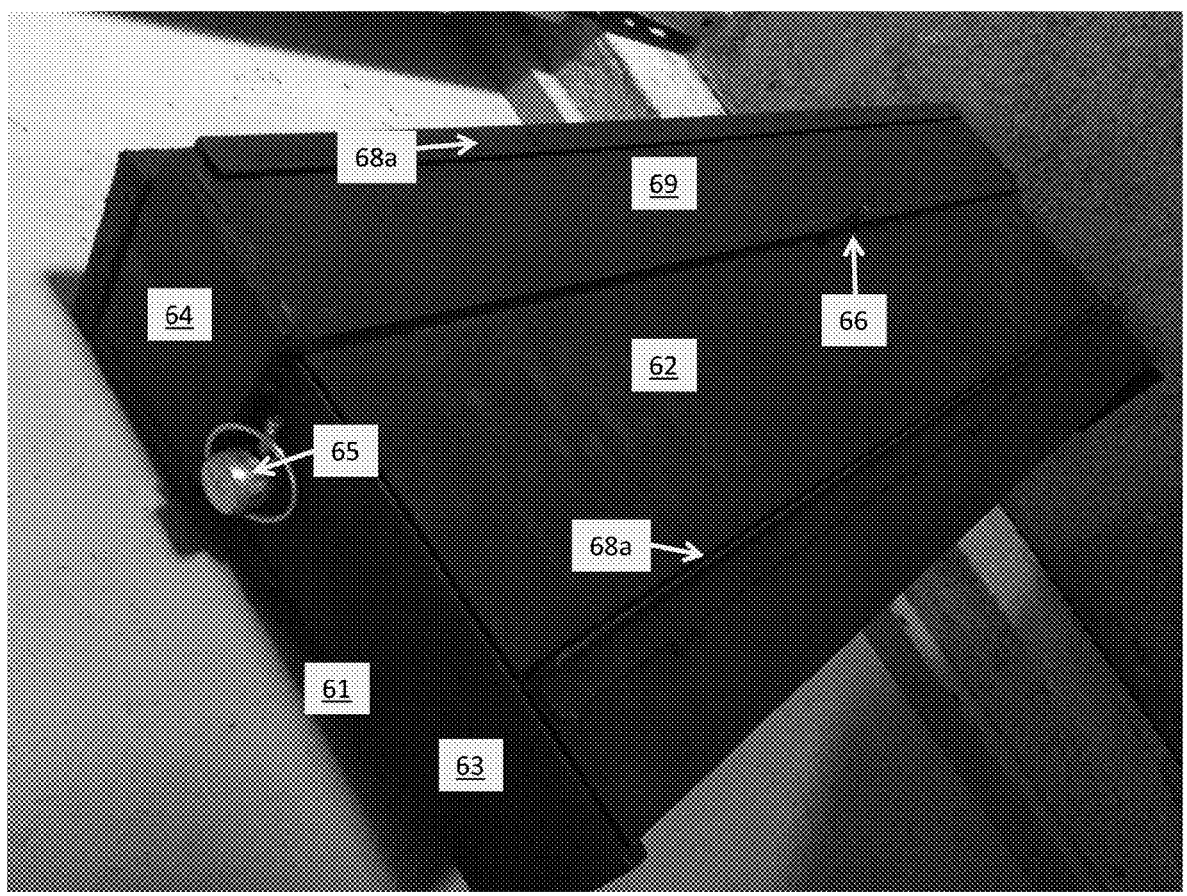

FIGS. 4-6 are photographs of an embodiment of the slidable platform assembly of the present invention. FIG. 4 and FIG. 5 are top view of the assembly, and FIG. 6 is a bottom view of the assembly. As shown, the assembly comprises a frame (41, 51, 61) in which a platform (42, 52, 62) freely slides. The frame comprises insert sections (43, 53, 63), attachment sections (44, 54, 64) with attachment pins inserted (45, 55, 65), and a frame stop (69). Also shown are attachment pins (45, 55, 65) inserted into holes in the attachment section for securing the frame and the assembly to the vehicle (not shown). The platform comprise a platform stop at the front end (68a) and a second platform stop near the back end (68b), positioned to engage the frame stop when the platform is extended or retracted accordingly. Also shown is a positioning pin (46, 56, 66) inserted through a pin hole, which, in combination with the stops, prevents movement of the platform, locking it in place.

The components of the assembly may be prepared from any material known in the art that is strong and rigid enough to support a person while standing on the extended platform without flexing. Preferred materials are also lightweight to enable a person to easily carry and install the assembly by attachment to the front of the vehicle, as described in more detail below. Examples include steel, aluminum or other known metals, particularly those that are resistant to rusting.

Figure 7:
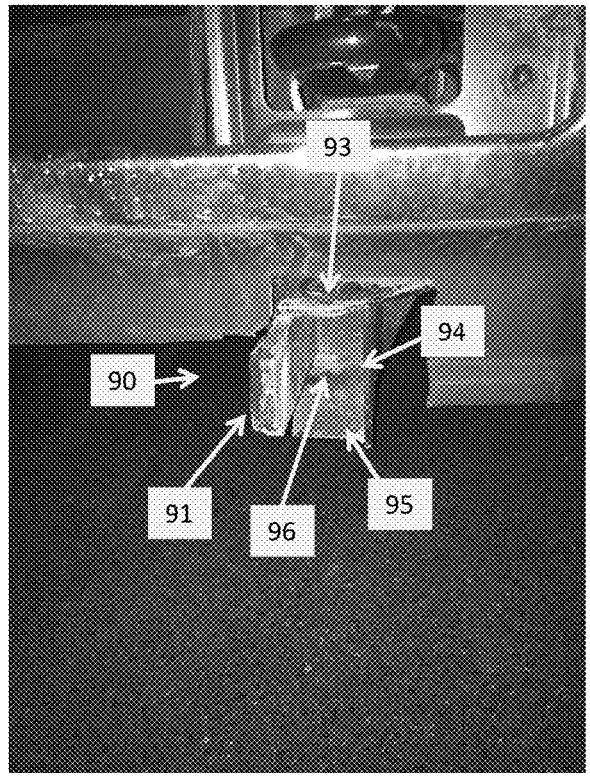
FIGS. 7-9 are views of a push plate system to which the slidable platform assembly of the present invention may be attachable.
Figure 8:
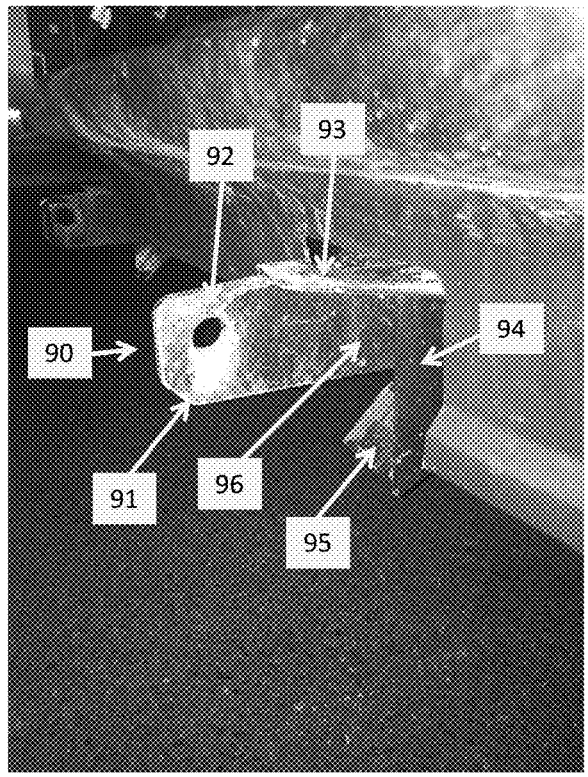
Figure 9:
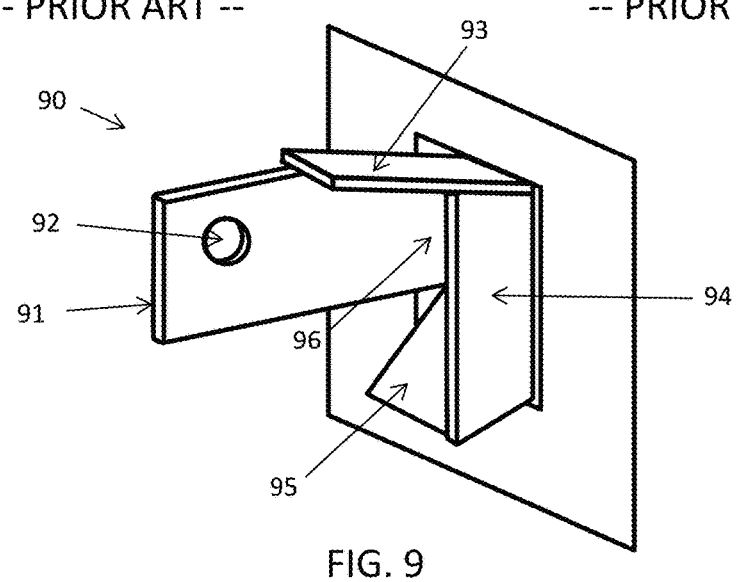

As discussed above, the slidable platform assembly a frame that includes attachment sections configured to be secured to corresponding receivers on a vehicle, such as a push plate system. An example of a suitable push plate is shown in FIGS. 7-9. In particular, FIGS. 7 and 8 are photographs that show a front view of a typical push plate system often used to secure a snow plow to a heavy duty truck, and FIG. 9 is a schematic drawing of FIG. 8. As can be seen, the exemplary push plate system 90 includes an extension bar 91 that projects outwardly from the vehicles bumper and preferably also includes top plate 93, side plate 94, and bottom plate 95, forming cavity 96. As shown, the plates may be angled to help guide a device to be attached to the vehicle into the cavity. The extension bar also includes hole 92 into which an attachment pin (not shown) may be inserted. The push plate system is correspondingly secured to the frame of the vehicle. When in use, a device, such as a snow plow, may be secured to the vehicle by insertion of an attachment section of the device into cavity 96 guided by plates 93, 94, and 95, and then secured to extension bar 91 by insertion of the attachment pin through hole 92 as well as a corresponding hole in the device attachment section.

Figure 10:
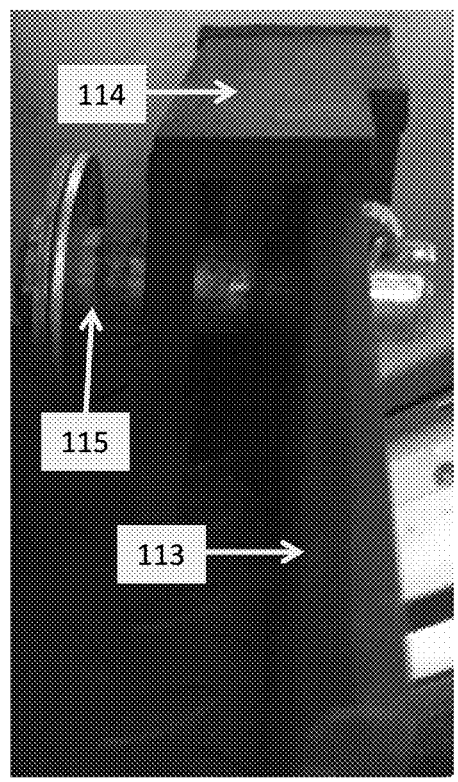
FIGS. 10-11 are views of the corresponding attachment section of the slidable platform assembly.
Figure 11:
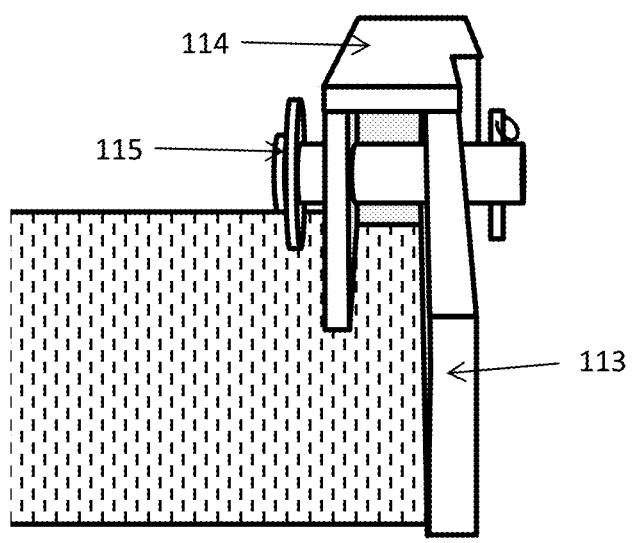

Components of the slidable platform assembly of the present invention may be configured to attach to a push plate system secured to a vehicle, such as that discussed above. For example, FIG. 10 is a photograph of a portion of the frame and platform of an embodiment of the slidable assembly shown in FIGS. 1A-1D, and FIG. 11 is a schematic view of the same portion. As shown, the frame includes insert section 113 and attachment section 114, and the attachment section is configured to form a cavity. Attachment pin 115 is shown inserted into and through the cavity as well as attachment holes (also shown in, for example, FIGS. 3A-3D). The insert section of the frame may be inserted into the cavity of a push plate system, and the extension bar of the push plate system may be inserted into the cavity of the attachment section of the frame, secured by the attachment pin.

Figure 12:
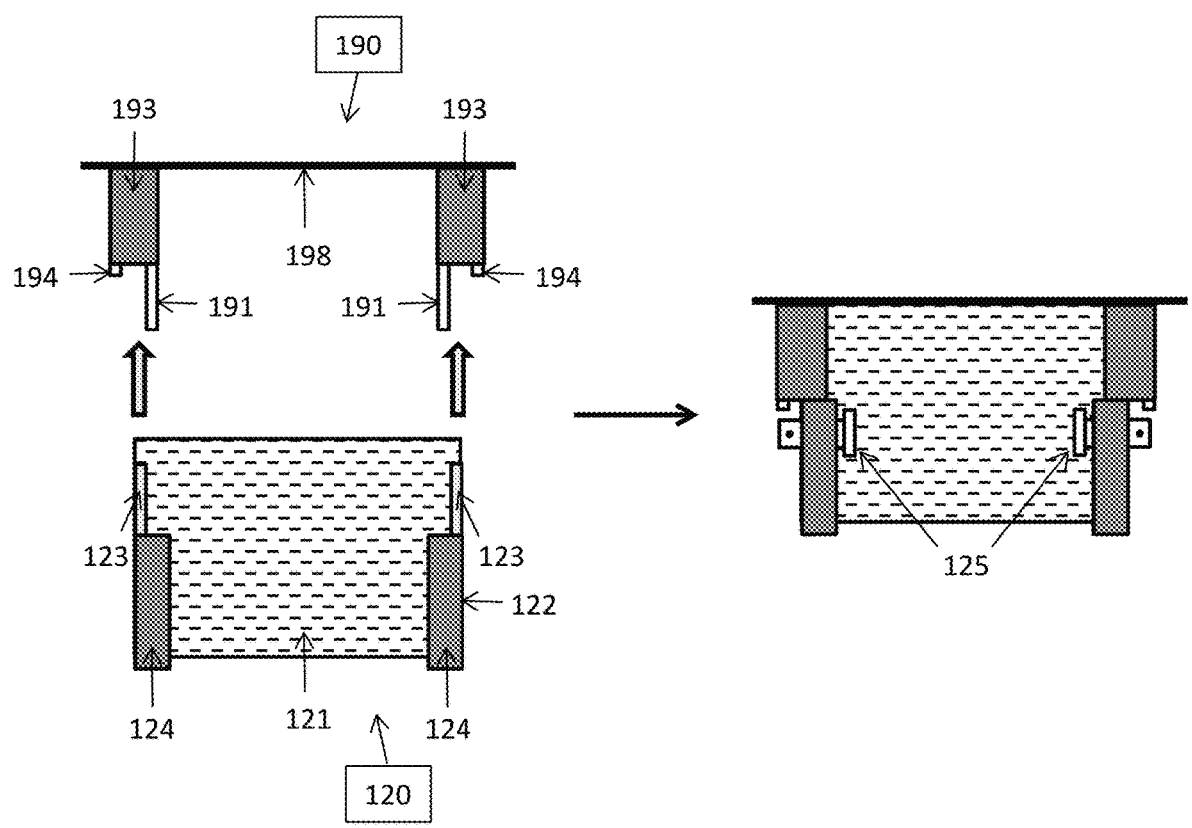
FIGS. 12-15 are views of attachments of the slidable platform assembly of the present invention to the front of a vehicle.

FIG. 12 shows an embodiment of the slidable platform assembly of the present invention being attached to a suitable push plate system. Thus, the present invention further relates to a method of attaching the slidable platform assembly to a receiver of a vehicle. The assembly can be any of those described in more detail above. In particular, in one embodiment, assembly 120 comprises frame 121 and platform 122, which includes insert section 123 and attachment section 124. Push plate system 190 comprises extension bar 191 as well as top plate 193, side plate 194, and a bottom plate (not shown) extending from bumper 198 of a vehicle. With the platform secured within the frame, the insert section of the frame may be inserted into the cavity of the push plate system while, simultaneously, the extension bar of the push plate system is inserted into the cavity of the attachment section of the frame. Alternatively, the assembly may be attached in a similar way with the platform removed, which can then be slid into the frame after it is secured. Assembly 120 may then be secured to push plate system 190 by insertion of attachment pins 125 through holes in both the attachment section and in the extension bar. In this example, the pins are inserted from the platform side of the attachment section to maximize the surface of the platform for standing.

Figure 13:
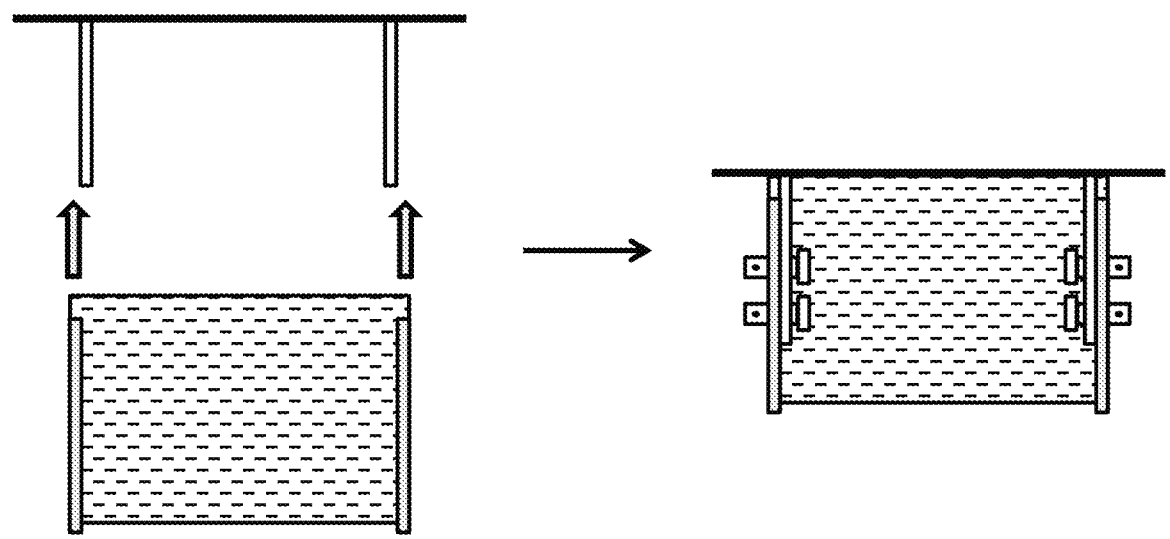
Figure 14:
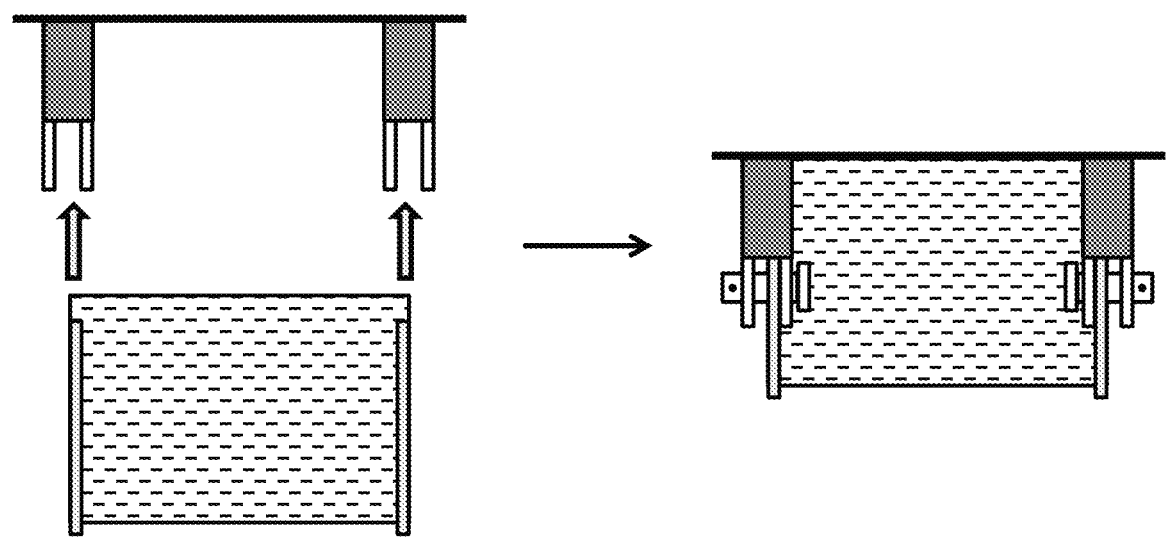
Figure 15:
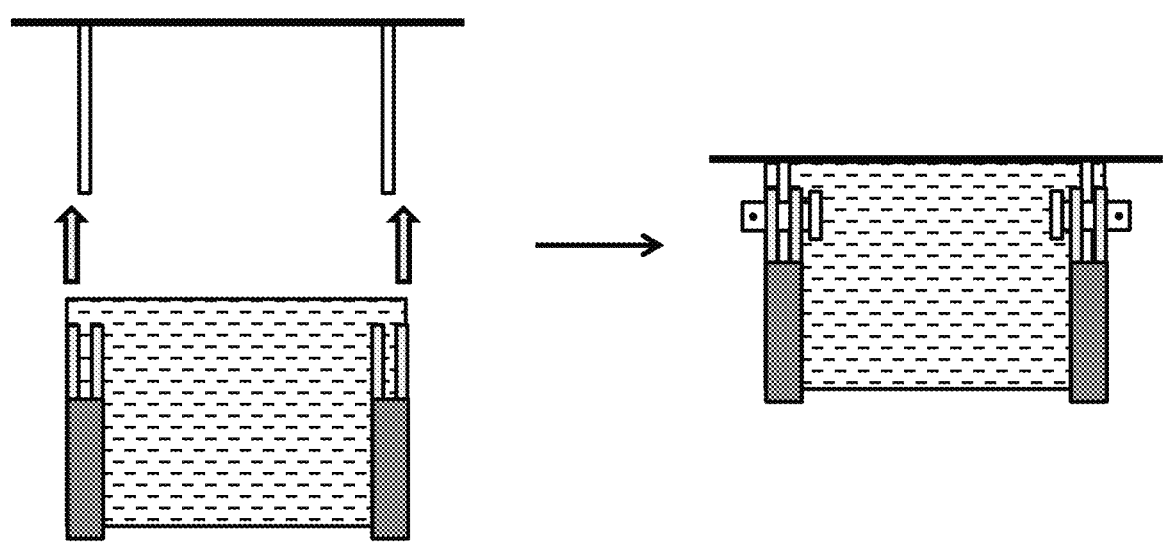

FIGS. 13-15 show alternative configurations of receivers on a vehicle that may also be used, along with different configurations of the attachment sections of the frame in order to secure the assembly to the front of the vehicle. For example, FIG. 13 shows an embodiment in which the frame of the assembly comprises attachment sections that do not include a cavity, and the receiver of the vehicle comprises an extension bar but also does not include a cavity. Without a corresponding cavity, the frame therefore does not require an insert section. In this configuration, the assembly can be attached directly to the extension bar of the receiver using multiple attachment pins, which may be preferred in order to provide sufficient stability for the attached platform assembly, particularly when someone is standing on the platform in the extended position. FIG. 14 shows another embodiment in which the receiver includes a cavity but the attachment section of the frame of the platform assembly does not. In addition, as shown, the receiver includes two parallel extension bars, both including holes to receive an attachment pin. In this configuration, an insert section of the frame may be inserted into the cavity of the receiver, and the attachment section may be attached to both of the extension bars of the receiver using an attachment pin. FIG. 15 shows yet another embodiment in which the receiver of the vehicle does not include a cavity. In this configuration, the frame does not include an insert section but, as shown, instead comprises two attachment sections, each including a hole to receive an attachment pin. The attachment section also includes a cavity into which the extension bar of the receiver may be inserted. The assembly can be secured to the vehicle receiver using an attachment pin inserted into the holes of the two attachment sections and the hole in the extension bar. Other configurations are also possible and would be known to one of ordinary skill in the art, given the benefit of this disclosure.

Figure 16:
FIGS. 16-21 are views of the slidable platform assembly of the present invention in the retracted and extended positions attached to the front of a vehicle.
Figure 17:
Figure 18:
Figure 19:
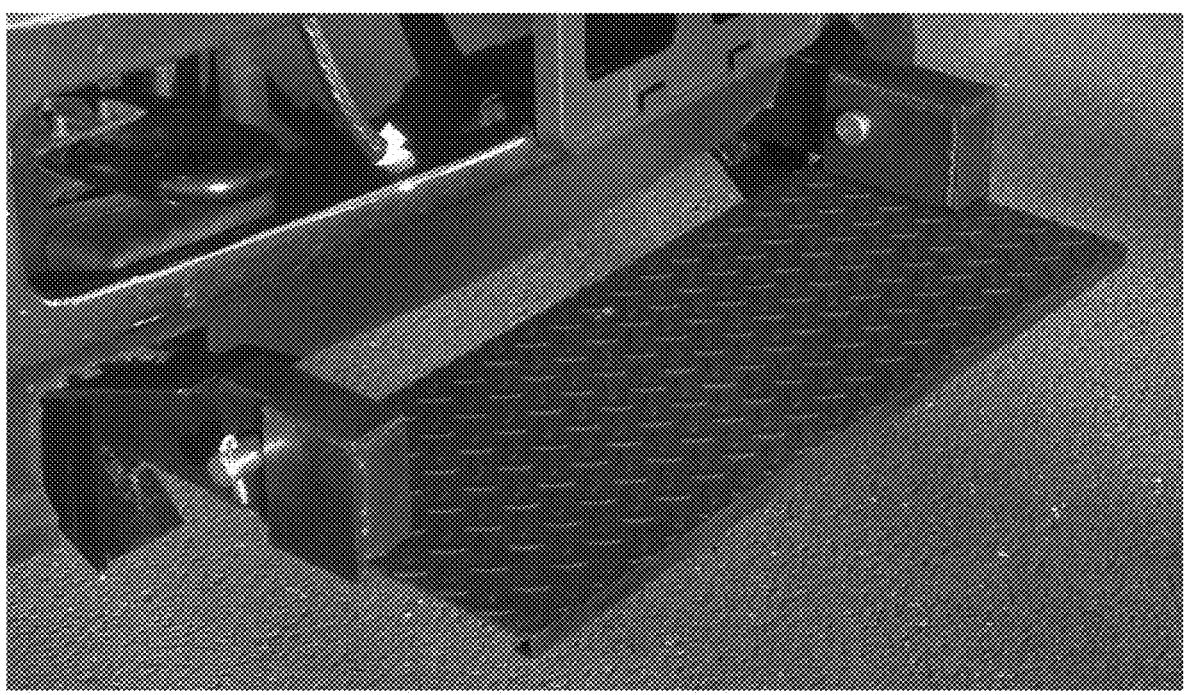
Figure 20:
Figure 21:

FIGS. 16-21 are photographs of an embodiment of the slidable platform assembly of the present invention attached to the front of a pick-up truck using an existing push plate system as a receiver on the truck. A snow plow, attached to the push plate system, was detached from the truck, and the slidable platform assembly was then attached as described in more detail above, particularly as shown in FIG. 12. FIG. 16 and FIG. 17 show the assembly attached and in the retracted position while FIG. 18 and FIG. 19 show the assembly attached with the platform extended. FIG. 20 and FIG. 21 show the assembly attached and the platform in the extended position and in use.

The assembly may also comprise one or more accessories that can be attachable to the frame or platform. For example, the assembly may comprise a tray stand, which can be used to store tools, drink, phones, music, or engine parts needed or removed during the maintenance or repair of the vehicle's engine. In addition, the assembly may comprise an adjustable light stand to direct light to the work area as needed. The accessories may be attachable to any portion of the platform assembly using any technique known in the art. For example, the assembly may comprise a pole stand having an end insertable into a corresponding receiver in the frame or platform or may have a magnetic end be movably secured magnetically to metallic portions of the frame or platform.

It has been found that the slidable platform assembly of the present invention provides a person with a safe, comfortable, and easy to install platform to stand on in order to gain ready access into the engine compartment of a large vehicle. No additional attachment devices are needed to secure the platform to the vehicle. Rather existing receivers present on the front of the vehicle can be used. The assembly is easy to install and uninstall, simple to extend and retract, and is both lightweight and compact enough for storage.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A platform assembly comprising:
a stationary frame attachable to one or more receivers secured to the front end of a vehicle, and a slidable platform positioned within the stationary frame,
wherein the platform is slidable between an extended and a retracted position and has a surface on which a person stands when in the extended position, and
wherein the stationary frame comprises two attachment sections each configured to secure the stationary frame to the one or more receivers and at least one frame slide stop extending between the two attachment sections restricting extension or retraction of the platform within the frame.

2. The platform assembly of claim 1, wherein the stationary frame comprises at least one insert section configured to be inserted into the one or more receivers.

3. The platform assembly of claim 2, wherein at least one of the insert sections comprises one or more attachment holes positioned to receive an attachment pin inserted therein to secure the stationary frame to the one or more receivers.

4. The platform assembly of claim 2, wherein the two attachment sections are configured to secure the stationary frame to two receivers.

5. The platform assembly of claim 4, wherein each attachment section comprises one or more attachment holes positioned to receive an attachment pin inserted therein to secure the stationary frame to the one or more receivers.

6. The platform assembly of claim 1, wherein the stationary frame is attachable to two separated receivers secured to the front end of a vehicle and comprises two insert sections each configured to be inserted into one of the two receivers.

7. The platform assembly of claim 6, wherein the stationary frame comprises at least one frame slide stop extending between the two attachment sections restricting extension or retraction of the platform within the frame.

8. The platform assembly of claim 7, wherein the stationary frame comprises two frame slide stops.

9. The platform assembly of claim 7, wherein the platform comprises at least one platform slide stop positioned to contact the at least one frame slide stop preventing the frame from further retraction or extension.

10. The platform assembly of claim 9, wherein the at least one platform slide stops are positioned underneath the platform.

11. The platform assembly of claim 9, wherein the platform comprises two platform slide stops.

12. The platform assembly of claim 11, wherein one platform slide stop is positioned to contact one side of the frame slide stop and the other platform slide stop is configured to contact an opposite side of the frame slide stop.

13. The platform assembly of claim 1, wherein the platform further comprises at least one pin hole configured to receive a positioning pin inserted therein to prevent platform movement.

14. The platform assembly of claim 1, wherein the receiver is a push plate system comprising an extension bar projecting outwardly from the vehicle.

15. A method of attaching a platform assembly to a vehicle, the platform assembly comprising a stationary frame and a slidable platform positioned within the stationary frame, the method comprising securing the stationary frame of the platform assembly to one or more receivers of the vehicle with the platform secured within the stationary frame,
wherein the platform is slidable between an extended and a retracted position and has a surface on which a person stands when in the extended position, and
wherein the stationary frame comprises two attachment sections each configured to secure the stationary frame to the one or more receivers and at least one frame slide stop extending between the two attachment sections restricting extension or retraction of the platform within the frame.

16. The method of claim 15, wherein the stationary frame comprises at least one insert section and wherein securing the stationary frame comprises inserting the insert section into the receiver.

17. The method of claim 16, wherein each attachment section comprises at least one attachment hole and wherein securing the stationary frame further comprises inserting an attachment pin through the attachment hole.

18. The method of claim 15, further comprising sliding the platform from a retracted position to an extended position.

19. The method of claim 18, further comprising securing the platform in the extended position by inserting a positioning pin into a pin hole positioning in the platform.

20. A method of attaching a platform assembly to a vehicle, the platform assembly comprising a stationary frame and a platform slidably positioned within the stationary frame, the method comprising securing the stationary frame of the platform assembly to one or more receivers of the vehicle without the platform secured within the stationary frame, and sliding the platform into the secured stationary frame,
wherein the platform is slidable between an extended and a retracted position and has a surface on which a person stands when in the extended position, and
wherein the stationary frame comprises two attachment sections each configured to secure the stationary frame to the one or more receivers and at least one frame slide stop extending between the two attachment sections restricting extension or retraction of the platform within the frame.

* * * * *